United States Patent
Kato et al.

(10) Patent No.: US 9,591,630 B2
(45) Date of Patent: Mar. 7, 2017

(54) WIRELESS COMMUNICATION SYSTEM, MOBILE STATION APPARATUS, BASE STATION APPARATUS, WIRELESS COMMUNICATION METHOD, AND INTEGRATED CIRCUIT

(71) Applicant: Sharp Kabushiki Kaisha, Osaka-shi, Osaka (JP)

(72) Inventors: Yasuyuki Kato, Osaka (JP); Katsunari Uemura, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/370,252

(22) PCT Filed: Dec. 20, 2012

(86) PCT No.: PCT/JP2012/083014
§ 371 (c)(1),
(2) Date: Jul. 2, 2014

(87) PCT Pub. No.: WO2013/105409
PCT Pub. Date: Jul. 18, 2013

(65) Prior Publication Data
US 2014/0348143 A1    Nov. 27, 2014

(30) Foreign Application Priority Data
Jan. 10, 2012  (JP) .................... 2012-001912

(51) Int. Cl.
H04W 72/04    (2009.01)
H04W 56/00    (2009.01)
H04W 52/00    (2009.01)
H04L 5/00     (2006.01)
H04W 52/02    (2009.01)

(52) U.S. Cl.
CPC ......... *H04W 72/042* (2013.01); *H04L 5/0032* (2013.01); *H04W 52/0206* (2013.01); *H04W 56/0005* (2013.01)

(58) Field of Classification Search
CPC ........... H04W 56/001; H04W 56/0015; H04W 56/002; H04W 56/004; H04W 56/0045;
(Continued)

(56) References Cited

U.S. PATENT DOCUMENTS

| 8,837,304 B2* | 9/2014 | Yamada | H04L 1/0618 370/241 |
| 2012/0257569 A1* | 10/2012 | Jang | H04L 5/001 370/328 |
| 2013/0034085 A1* | 2/2013 | Bostrom | H04W 56/0045 370/336 |

(Continued)

FOREIGN PATENT DOCUMENTS

WO    2011/038272 A1    3/2011

OTHER PUBLICATIONS

U.S. Appl. No. 61/471,872.*
(Continued)

*Primary Examiner* — Xavier Szewai Wong
(74) *Attorney, Agent, or Firm* — Keating & Bennett, LLP

(57) ABSTRACT

A base station apparatus assigns a plurality of cells to a mobile station apparatus, and the base station apparatus and the mobile station apparatus communicate with each other via the plurality of cells. The plurality of cells are grouped into a plurality of groups, each group being made up of at least one cell having an identical transmission timing in the mobile station apparatus. In a case where a cell that has been deleted from one of the plurality of groups is added to another one of the plurality of groups in accordance with an instruction from the base station apparatus, the mobile station apparatus sets the added cell to be in a deactivated state.

9 Claims, 6 Drawing Sheets

(58) Field of Classification Search
CPC . H04W 56/005; H04W 60/00; H04W 60/005; H04W 60/06; H04L 27/2655
See application file for complete search history.

(56) References Cited

U.S. PATENT DOCUMENTS

2014/0161111 A1* 6/2014 Kim .................. H04W 56/0005
370/336

OTHER PUBLICATIONS

Official Communication issued in International Patent Application No. PCT/JP2012/083014, mailed on Feb. 5, 2013.

3GPP TS 36.300 V10.5.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", Sep. 2011, pp. 1-194.

3GPP TR 36.814 V9.0.0, "3rd Generation Partnership Project; Technical Specification Group Radio Access Network; Evolved Universal Terrestrial Radio Access (E-UTRA); Further advancements for E-UTRA physical layer aspects (Release 9)", Mar. 2010, pp. 1-104.

"LTE; Evolved Universal Terrestrial Radio Access (E-UTRA) and Evolved Universal Terrestrial Radio Access Network (E-UTRAN); Overall description, Stage 2 (3GPP TS 36.300 version 10.5.0 Release 10)", Nov. 1, 2011, 208 pages.

* cited by examiner

WIRELESS COMMUNICATION SYSTEM, MOBILE STATION APPARATUS, BASE STATION APPARATUS, WIRELESS COMMUNICATION METHOD, AND INTEGRATED CIRCUIT

TECHNICAL FIELD

An embodiment of the present invention relates to a base station apparatus, a mobile station apparatus, and a wireless communication system, and more specifically relates to a wireless communication system, a mobile station apparatus, a base station apparatus, a wireless communication method, and an integrated circuit in a case where a transmission timing group is changed.

BACKGROUND ART

In 3GPP (3rd Generation Partnership Project), a W-CDMA scheme has been standardized as a third-generation cellular mobile communication scheme, and services based on the scheme have been sequentially started. Also, HSDPA with higher communication speed has been standardized, and services based thereon have been started.

Meanwhile, in 3GPP, standardization of evolved third-generation radio access (Evolved Universal Terrestrial Radio Access, hereinafter referred to as "EUTRA") is progressing. As a downlink communication scheme of EUTRA, an OFDM (Orthogonal Frequency Division Multiplexing) scheme, which is resistant to multipath interference and is suitable for high-speed transmission, has been employed. As an uplink communication scheme, a DFT (Discrete Fourier Transform)-spread OFDM scheme of an SC-FDMA (Single Carrier-Frequency Division Multiple Access) scheme, in which peak to average power ratio (PAPR) of a transmit signal can be reduced, has been employed in consideration of the cost and power consumption of mobile station apparatuses.

Furthermore, in 3GPP, discussions over Advanced-EUTRA, which is further advancement of EUTRA, have started. Advanced-EUTRA assumes communications that is performed at a transmission rate of up to 1 Gbps or more in downlink and up to 500 Mbps or more in uplink by using a band having a bandwidth of up to 100 MHz in each of the uplink and the downlink.

In Advanced-EUTRA, it is considered that a band of up to 100 MHz is to be realized by aggregating a plurality of bands of EUTRA, each having a bandwidth of 20 MHz or less, so that mobile station apparatuses of EUTRA can be supported. In Advanced-EUTRA, each band of EUTRA of 20 MHz or less is called a "component carrier (CC)" (see NPL 2). One downlink component carrier and one uplink component carrier form one cell. One downlink component carrier alone can form one cell. A base station apparatus assigns a plurality of cells to a mobile station apparatus, and communicates with the mobile station apparatus via the assigned cells.

Also, in Advanced-EUTRA, it is studied that a base station apparatus and a mobile station apparatus communicate with each other via a plurality of component carriers via a repeater or an RRH (Radio Remote Head), as illustrated in FIG. 12. In such a case, reception timing at which the mobile station apparatus receives data from a downlink component carrier may vary among individual cells. Also, transmission timing (Timing Advance: TA) at which the mobile station apparatus transmits data to the base station apparatus may vary among uplink component carriers of individual cells. Thus, the mobile station apparatus adjusts transmission timing for the uplink component carrier of each cell or for each group of component carriers having an identical transmission timing. A group of component carriers (or cells) having an identical transmission timing is referred to as a "transmission timing group (TA group)".

The base station apparatus sets a transmission timing group to a mobile station apparatus to which cells of different transmission timings have been assigned. Also, the base station apparatus resets a transmission timing group to the mobile station apparatus in accordance with a change in communication status.

CITATION LIST

Non Patent Literature

NPL 1: 3GPP TS (Technical Specification) 36.300, V10.50 (2011-09), Evolved Universal Terrestrial Radio Access (E-UTRA) and Evolved Universal Terrestrial Radio Access Network (E-UTRAN), Overall description Stage2

NPL 2: 3GPP TR (Technical Specification) 36.814, V9.00 (2010-03), Evolved Universal Terrestrial Radio Access (E-UTRA) Further advancements for E-UTRA physical layer aspects

SUMMARY OF INVENTION

Technical Problem

Each transmission timing group includes one timing reference cell. The transmission timing of each transmission timing group is determined on the basis of the downlink reception timing of the timing reference cell. Transmission timing information about the transmission timing group reported from a base station apparatus adjusts the uplink transmission timing of the timing reference cell.

The base station apparatus may reset a transmission timing group to a mobile station apparatus in accordance with a change in communication status, for example, due to a movement of the mobile station apparatus. In a case where the base station apparatus resets a transmission timing group, and where a timing reference cell is deleted from the transmission timing group or is moved to another transmission timing group, absence of the timing reference cell of the transmission timing group causes absence of reference timing, and the mobile station apparatus becomes incapable of performing uplink transmission.

An embodiment of the present invention has been made in view of the above-described circumstances, and an object of the embodiment is to provide a wireless communication system, a mobile station apparatus, a base station apparatus, a wireless communication method, and an integrated circuit that enable highly efficient operations even in a case where a base station apparatus resets a transmission timing group for a mobile station apparatus while communication is being performed.

Solution to Problem (1) To achieve the above-described object, an embodiment of the present invention takes the following measures. That is, a wireless communication system according to the embodiment of the present invention is a wireless communication system in which a base station apparatus and a mobile station apparatus communicate with each other via a plurality of cells which are assigned to the mobile station apparatus by the base station apparatus. Among the plurality of cells, cells having an identical uplink transmission timing are grouped into a group. One of the cells in the group is set as a timing reference cell which serves as a reference of transmission timing. The base station apparatus transmits a message for changing a group configuration of the group to the mobile station apparatus. The mobile station apparatus receives the message. In a case where the message indicates a change of the timing reference cell and includes random access information, the mobile station apparatus starts a random access procedure by using a new timing reference cell.

(2) In the wireless communication system according to the embodiment of the present invention, the timing reference cell for transmitting a random access preamble is an activated cell.

(3) In the wireless communication system according to the embodiment of the present invention, the random access information includes at least a preamble number.

(4) In the wireless communication system according to the embodiment of the present invention, uplink radio resources allocated to the cells in the group are maintained.

(5) In the wireless communication system according to the embodiment of the present invention, regarding a cell to be moved to another group in accordance with the message, the state of the cell after movement is determined in accordance with the state of a timing reference cell of the other group.

(6) In the wireless communication system according to the embodiment of the present invention, the state of the cell after movement is an activated state or a deactivated state.

(7) A mobile station apparatus according to the embodiment of the present invention is a mobile station apparatus that communicates with a base station apparatus via a plurality of cells which are assigned to the mobile station apparatus by the base station apparatus. Among the plurality of cells, cells having an identical uplink transmission timing are grouped into a group. One of the cells in the group is set as a timing reference cell which serves as a reference of transmission timing. The mobile station apparatus receives a message for changing a group configuration of the group from the base station apparatus. In a case where the message indicates a change of the timing reference cell and includes random access information, the mobile station apparatus starts a random access procedure by using a new timing reference cell.

(8) The mobile station apparatus according to the embodiment of the present invention transmits a random access preamble in a case where the new timing reference cell is in an activated state.

(9) A base station apparatus according to the embodiment of the present invention is a base station apparatus that communicates with a mobile station apparatus via a plurality of cells which are assigned to the mobile station apparatus by the base station apparatus. Among the plurality of cells, cells having an identical uplink transmission timing are grouped into a group. One of the cells in the group is set as a timing reference cell which serves as a reference of transmission timing. The base station apparatus includes, in a message for changing a group configuration of the group, group identification information about the group, identification information about the cells included in the group, identification information about a new timing reference cell, and random access information, and transmits the message for changing the group configuration of the group to the mobile station apparatus.

(10) The base station apparatus according to the embodiment of the present invention includes at least a preamble number in the random access information.

(11) A wireless communication method according to the embodiment of the present invention is a wireless communication method that is applied to a wireless communication system in which a base station apparatus and a mobile station apparatus communicate with each other via a plurality of cells which are assigned to the mobile station apparatus by the base station apparatus. Among the plurality of cells, cells having an identical uplink transmission timing are grouped into a group. One of the cells in the group is set as a timing reference cell which serves as a reference of transmission timing. The base station apparatus includes a step of transmitting a message for changing a group configuration of the group to the mobile station apparatus. The mobile station apparatus includes a step of receiving the message, and a step of, in a case where the message indicates a change of the timing reference cell and includes random access information, starting a random access procedure by using a new timing reference cell.

(12) An integrated circuit according to the embodiment of the present invention is an integrated circuit that is applied to a mobile station apparatus that communicates with a base station apparatus via a plurality of cells which are assigned to the mobile station apparatus by the base station apparatus. Among the plurality of cells, cells having an identical uplink transmission timing are grouped into a group. One of the cells in the group is set as a timing reference cell which serves as a reference of transmission timing. The integrated circuit includes means for receiving a message for changing a group configuration of the group from the base station apparatus, and means for, in a case where the message indicates a change of the timing reference cell and includes random access information, starting a random access procedure by using a new timing reference cell.

(13) An integrated circuit according to the embodiment of the present invention is an integrated circuit that is applied to a base station apparatus that communicates with a mobile station apparatus via a plurality of cells which are assigned to the mobile station apparatus by the base station apparatus. Among the plurality of cells, cells having an identical uplink transmission timing are grouped into a group. One of the cells in the group is set as a timing reference cell which serves as a reference of transmission timing. The integrated circuit includes means for including, in a message for changing a group configuration of the group, identification information about the group, identification information about the cells included in the group, identification information about a new timing reference cell, and random access information, and means for transmitting the message to the mobile station apparatus.

Advantageous Effects of Invention

According to an embodiment of the present invention, there are provided a wireless communication system, a mobile station apparatus, a base station apparatus, a wireless communication method, and an integrated circuit that efficiently control, in a case where the configuration of a transmission timing group having an identical uplink transmission timing is reset, operation for cells whose configuration has been changed.

BRIEF DESCRIPTION OF DRAWINGS

FIG. 3-1 is a diagram illustrating an example configuration of cells according to the embodiment of the present invention.

FIG. 3-2 is a diagram illustrating an example configuration of cells according to the embodiment of the present invention.

FIG. 3-3 is a diagram illustrating an example configuration of cells according to the embodiment of the present invention.

DESCRIPTION OF EMBODIMENTS

The downlink of EUTRA is made up of a downlink reference signal, a downlink synchronization channel DSCH, a physical downlink shared channel PDSCH, a physical downlink control channel PDCCH, and a physical broadcast channel PBCH.

The uplink of EUTRA is made up of an uplink reference signal, a physical random access channel RACH, a physical uplink shared channel PUSCH, and a physical uplink control channel PUCCH. There are two types of uplink reference signals: a demodulation reference signal and a sounding reference signal.

Figure 5:
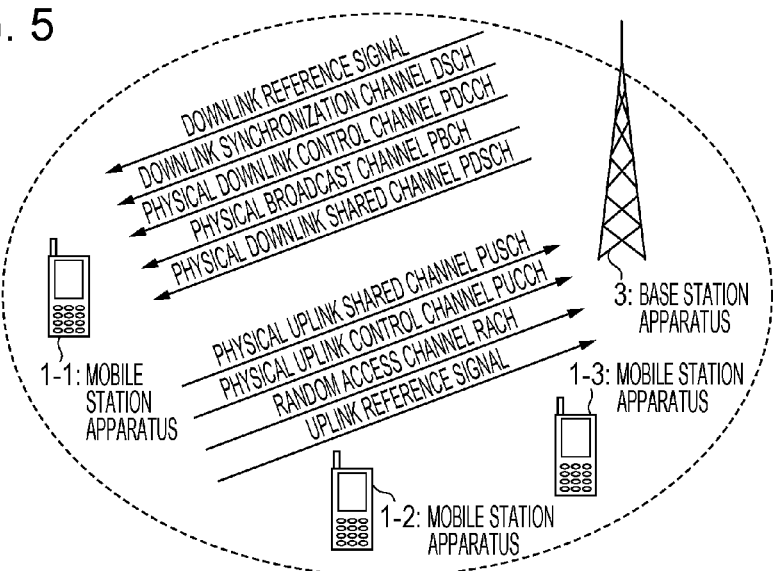
FIG. 5 is a diagram illustrating a channel configuration in EUTRA.
Figure 6:
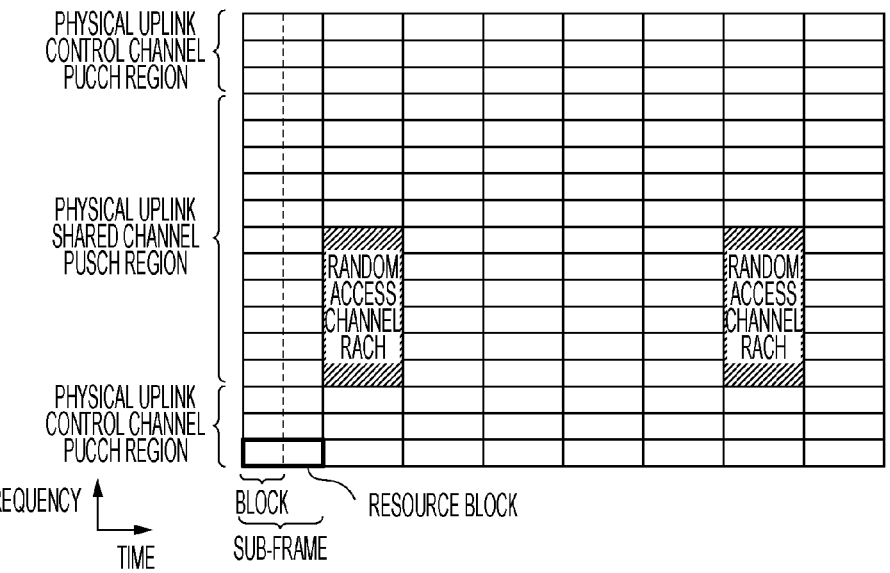
FIG. 6 is a diagram illustrating an uplink configuration in EUTRA.
Figure 7:
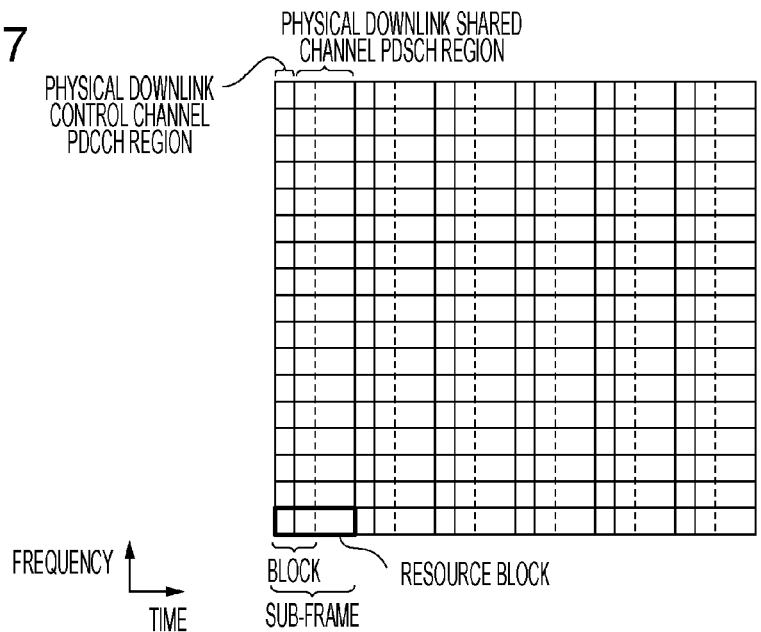
FIG. 7 is a diagram illustrating a downlink configuration in EUTRA.

FIG. 5 is a diagram illustrating a channel configuration in EUTRA. FIG. 6 is a diagram illustrating an uplink configuration in EUTRA. FIG. 7 is a diagram illustrating a downlink configuration in EUTRA. One block is made up of twelve sub-carriers and seven OFDM symbols. Two blocks form one resource block (RB). The physical uplink shared channel PUSCH and the physical uplink control channel PUCCH are used in units of resource blocks. The random access channel RACH is formed by using six resource blocks.

The uplink reference signal is mapped to specific OFDM symbols in each resource block. As illustrated in FIG. 6, the individual uplink channels are distributed to a region of the physical uplink shared channel PUSCH, a region of the physical uplink control channel PUCCH, and the random access channel RACH. Information about the region of the physical uplink shared channel PUSCH and the region of the physical uplink control channel PUCCH is reported from a base station apparatus. The base station apparatus allocates, to each mobile station apparatus, radio resources for the physical uplink shared channel PUSCH and the physical uplink control channel PUSCH from the individual regions. The random access channel RACH is mapped at a certain interval.

The physical downlink shared channel PDSCH is used to transmit user data and control data from the base station apparatus to the mobile station apparatus. The physical downlink control channel PDCCH is used by the base station apparatus to notify the mobile station apparatus of control information, such as radio resource allocation information for the physical downlink shared channel PDSCH and the physical uplink shared channel PUSCH. The downlink reference signal is used to demodulate the physical downlink shared channel PDSCH and the physical downlink control channel PDCCH. The downlink synchronization channel DSCH is used by the mobile station apparatus to achieve downlink synchronization. The physical broadcast channel PBCH is used to broadcast information about system information about the base station apparatus.

The physical uplink shared channel PUSCH is used to transmit user data and control data from the mobile station apparatus to the base station apparatus. The data transmitted and received on the physical uplink shared channel PUSCH and the physical downlink shared channel PUSCH is subjected to HARQ (Hybrid Automatic Repeat reQuest) processing, and data that is transmitted first and data that is retransmitted are combined together at the time of retransmission to improve the ability of correcting errors in data at the time of retransmission. The physical uplink control channel PUSCH is used to report control information, such as a downlink response (Ack (Acknowledge)/Nack (Negative acknowledge)) to data transmitted from the base station apparatus and downlink radio channel quality information.

The random access channel RACH is mainly used to transmit a random access preamble from the mobile station apparatus to the base station apparatus in order to obtain transmission timing information. The random access preamble is transmitted during a random access procedure. The demodulation reference signal of the uplink reference signal is used by the base station apparatus to demodulate the physical uplink shared channel PUSCH. The demodulation reference signal is inserted at the fourth and eleventh symbol positions of the physical uplink shared channel PUSCH. The sounding reference signal of the uplink reference signal is used by the base station apparatus to measure uplink radio channel quality. The sounding reference signal is inserted at the fourteenth symbol position of the physical uplink shared channel PUSCH. A radio resource for transmitting the sounding reference signal is allocated to each mobile station apparatus by the base station apparatus.

The random access procedure includes the following two access procedures: contention based random access and non-contention based random access (see NPL 1).

Figure 8:
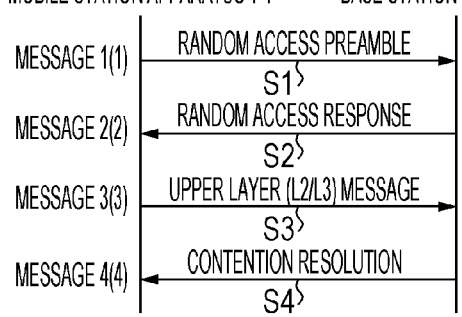
FIG. 8 is a diagram illustrating a procedure of contention based random access.

FIG. 8 is a diagram illustrating a procedure of contention based random access. Contention based random access is random access in which contention among mobile station apparatuses may occur. Contention based random access is performed, for example, to make a scheduling request when initial access is performed in a state where connection to (communication with) the base station apparatus has not been established or when uplink data transmission occurs in the mobile station apparatus in a state where connection to the base station apparatus has been established but uplink synchronization is lost.

Figure 9:
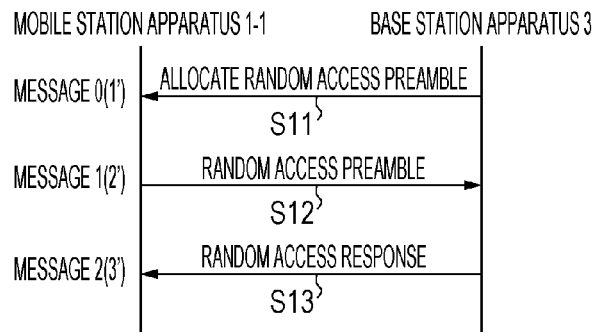
FIG. 9 is a diagram illustrating a procedure of non-contention based random access.

FIG. 9 is a diagram illustrating a procedure of non-contention based random access. Non-contention based random access is random access in which contention among mobile station apparatuses does not occur. In non-contention based random access, the mobile station apparatus starts random access in response to an instruction from the base station apparatus in special cases, such as in a case where handover is performed to quickly achieve uplink synchronization between the mobile station apparatus and the base station apparatus when uplink synchronization is lost though a connection between the base station apparatus and the mobile station apparatus has been established, or in a case where the transmission timing of the mobile station apparatus is invalid (see NPL 1). In non-contention based random access, the base station apparatus provides an instruction to the mobile station apparatus by using a message of an RRC (Radio Resource Control: Layer 3) layer and control data on the physical downlink control channel PDCCH.

The contention based random access procedure will be briefly described with reference to FIG. 8. First, a mobile station apparatus 1-1 transmits a random access preamble to a base station apparatus 3 (message 1: (1), step S1). Subsequently, the base station apparatus 3 that has received the random access preamble transmits a response to the random access preamble (random access response) to the mobile station apparatus 1-1 (message 2: (2), step S2). The mobile station apparatus 1-1 transmits an upper layer (Layer 2/Layer 3) message on the basis of scheduling information included in the random access response (message 3: (3), step S3). The base station apparatus 3 transmits a contention resolution message to the mobile station apparatus 1-1 from which the upper layer message of (3) has successfully been received (message 4: (4), step S4). Contention based random access is also referred to as "random preamble transmission".

The non-contention based random access procedure will be briefly described with reference to FIG. 9. First, the base station apparatus 3 notifies the mobile station apparatus 1-1 of a preamble number (or sequence number) and a random access channel number to be used (message 0: (1'), step S11). The mobile station apparatus 1-1 transmits a random access preamble of the specified preamble number on the specified random access channel RACH (message 1: (2'), step S12). Subsequently, the base station apparatus 3 that has received the random access preamble transmits a response to the random access preamble (random access response) to the mobile station apparatus 1-1 (message 2: (3'), step S13). In a case where the value of the notified preamble number is 0, the mobile station apparatus 1-1 performs contention based random access. Non-contention based random access is also referred to as "dedicated preamble transmission".

A procedure of establishing a connection to the base station apparatus 3 by the mobile station apparatus 1-1 will be described with reference to FIG. 8. First, the mobile station apparatus 1-1 obtains system information about the base station apparatus 3 from the physical broadcast channel PBCH or the like, and executes a random access procedure by using random access related information included in the system information to establish a connection to the base station apparatus 3. The mobile station apparatus 1-1 generates a random access preamble from the random access related information or the like included in the system information. Subsequently, the mobile station apparatus 1-1 transmits the random access preamble on the random access channel RACH (message 1: (1)). Note that the random access related information includes the configuration of the random access channel RACH, information about generation of the random access preamble, information used to transmit and receive individual messages in the random access procedure, and so forth.

Upon detecting the random access preamble transmitted from the mobile station apparatus 1-1, the base station apparatus 3 calculates an amount of difference in transmission timing between the mobile station apparatus 1-1 and the base station apparatus 3 by using the random access preamble. Subsequently, the base station apparatus 3 performs scheduling for transmitting a Layer 2 (L2)/Layer 3 (L3) message (specifies the position of an uplink radio resource (the position of the physical uplink shared channel PUSCH), a transmission format (message size), and so forth); assigns Temporary C-RNTI (Cell-Radio Network Temporary Identity: mobile station apparatus identification information); and maps, to the physical downlink control channel PDCCH, RA-RNTI (Random Access-Radio Network Temporary Identify: random access response identification information) representing a response (random access response) to the mobile station apparatus 1-1 that has transmitted the random access preamble on the random access channel RACH. The base station apparatus 3 then transmits, on the physical downlink shared channel PDSCH, a random access response message including transmission timing information, scheduling information, Temporary C-RNTI, and information about the received random access preamble (message 2: (2)).

Upon detecting the RA-RNTI on the physical downlink control channel PDCCH, the mobile station apparatus 1-1 checks the content of the random access response message mapped to the physical downlink shared channel PDSCH. In a case where information about the transmitted random access preamble is included in the random access response message, the mobile station apparatus 1-1 adjusts uplink transmission timing by using the transmission timing information, and transmits, using the scheduled radio resource and transmission format, an L2/L3 message including information for identifying the mobile station apparatus 1-1, such as C-RNTI (or Temporary C-RNTI) or IMSI (International Mobile Subscriber Identity) (message 3: (3)).

After adjusting the transmission timing, the mobile station apparatus 1-1 starts a transmission timing timer for which the adjusted transmission timing is valid. The adjusted transmission timing becomes invalid upon expiration of the transmission timing timer. While the transmission timing is valid, the mobile station apparatus 1-1 is capable of transmitting data to the base station apparatus. In a case where the transmission timing is invalid, the mobile station apparatus 1-1 is capable of transmitting only a random access preamble. A period over which the transmission timing is valid is also referred to as an "uplink synchronization state", whereas a period over which the transmission timing is invalid is also referred to as an "uplink non-synchronization state.

Upon receiving the L2/L3 message from the mobile station apparatus 1-1, the base station apparatus 3 transmits, by using C-RNTI (or Temporary C-RNTI) or IMSI included in the received L2/L3 message, a contention resolution message to the mobile station apparatus 1-1 in order to determine whether or not contention has occurred among the mobile station apparatuses 1-1 to 1-3 (message 4: (4)).

In a case where the mobile station apparatus 1-1 does not detect a random access response message including the preamble number corresponding to the transmitted random access preamble within a certain period, or has failed to transmit the message 3, or does not detect identification information about the mobile station apparatus 1-1 in the contention resolution message within a certain period, the mobile station apparatus 1-1 retransmits the random access preamble (message 1: (1)). In a case where the number of times the random access preamble has been transmitted exceeds the maximum number of transmissions of the random access preamble, which is indicated by the system information, the mobile station apparatus 1-1 determines that random access has failed, and disconnects communication with the base station apparatus 3. After the random access procedure has successfully been performed, control data for establishing a connection is further transmitted and received between the base station apparatus 3 and the mobile station apparatus 1-1. At this time, the base station apparatus 3 notifies the mobile station apparatus 1-1 of allocation information about the uplink reference signal and the physical uplink control channel PUCCH, which are individually allocated.

After the random access procedure has been completed, the uplink transmission timing is updated in the following manner. The base station apparatus 3 measures the uplink reference signal (sounding reference signal or demodulation reference signal) transmitted from the mobile station apparatus 1-1 to calculate transmission timing information, and notifies the mobile station apparatus 1-1 of the calculated transmission timing information. Upon updating the transmission timing information reported from the base station apparatus 3, the mobile station apparatus 1-1 restarts the transmission timing timer. The base station apparatus 3 also has the same transmission timing timer as the mobile station apparatus 1-1. The base station apparatus 3 starts or restarts the transmission timing timer upon transmitting the transmission timing information. In this way, the base station apparatus 3 and the mobile station apparatus 1-1 manage the uplink synchronization state. Upon expiration of the transmission timing timer, the transmission timing becomes invalid, and uplink transmission is stopped except for transmission of a random access preamble.

The transmission timing is also adjusted in accordance with a change in reception timing of a downlink signal, which is measured by the mobile station apparatus 1-1, in addition to the transmission timing information reported from the base station apparatus 3. The mobile station apparatus 1-1 adjusts the reception timing to optimum reception timing while measuring the downlink synchronization channel DSCH or the downlink reference signal. Upon changing the reception timing, the mobile station apparatus 1-1 reflects the difference between the previous reception timing and the new reception timing in the transmission timing.

In 3GPP, discussions over Advanced-EUTRA, which is further advancement of EUTRA, have started. Advanced-EUTRA assumes communications that is performed at a transmission rate of up to 1 Gbps or more in downlink and up to 500 Mbps or more in uplink by using a band having a bandwidth of up to 100 MHz in each of the uplink and the downlink.

Figure 10:
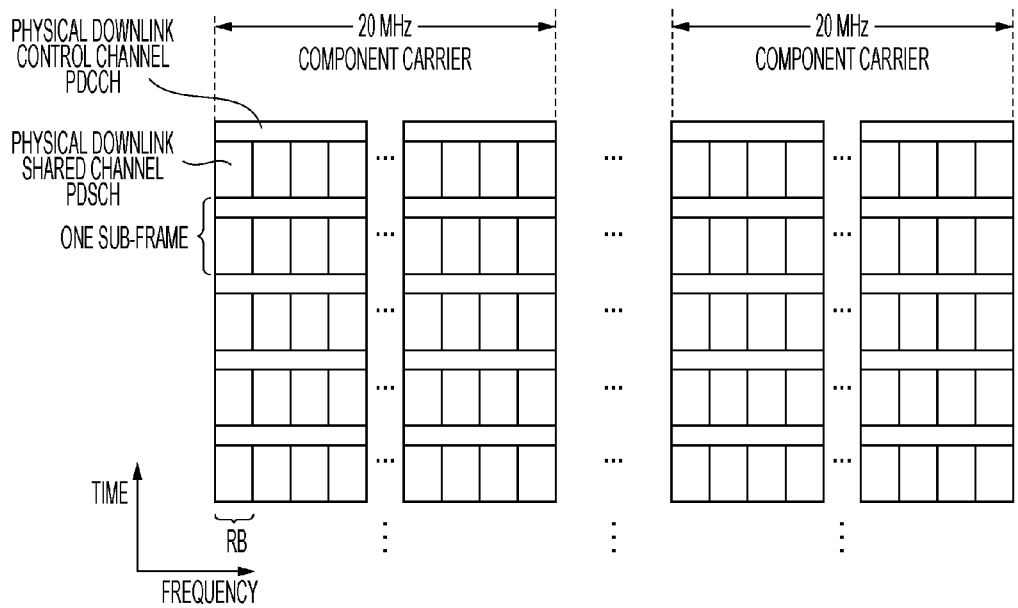
FIG. 10 is an explanatory diagram illustrating a case where a plurality of downlink component carriers are aggregated.
Figure 11:
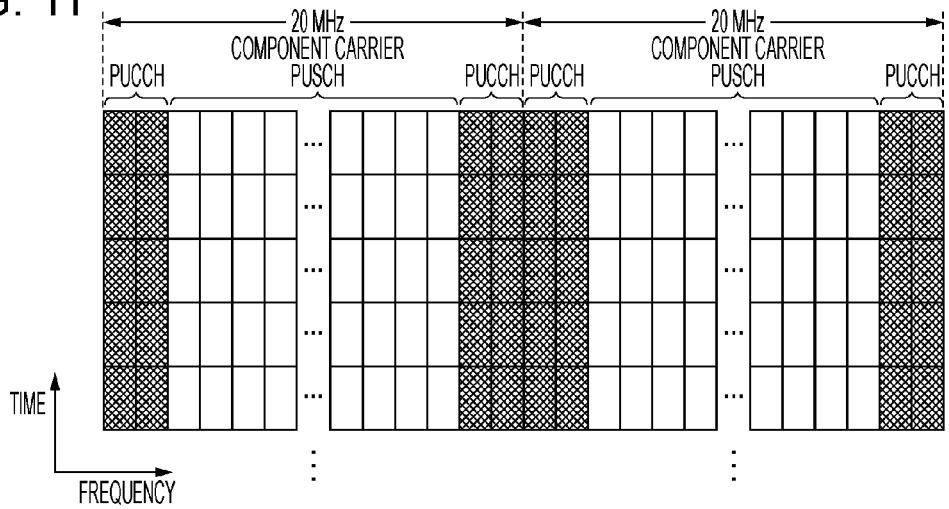
FIG. 11 is an explanatory diagram illustrating a case where a plurality of uplink component carriers are aggregated.

FIG. 10 is an explanatory diagram illustrating downlink component carriers in Advanced-EUTRA. FIG. 11 is an explanatory diagram illustrating uplink component carriers in Advanced-EUTRA.

In Advanced-EUTRA, it is considered that a band of up to 100 MHz is to be realized by aggregating a plurality of bands of EUTRA, each having a bandwidth of 20 MHz or less, so that mobile station apparatuses of EUTRA can be supported. In Advanced-EUTRA, each band of EUTRA of 20 MHz or less is called a "component carrier (CC)" (see NPL 2). One downlink component carrier and one uplink component carrier form one cell. One downlink component carrier alone can form one cell. Regarding a combination of a downlink component carrier and an uplink component carrier, information about a link to an uplink component carrier is indicated in system information about a cell broadcasted on a downlink component carrier, or a combination of a downlink component carrier and an uplink component carrier is indicated by the base station apparatus for each mobile station apparatus.

In Advanced-EUTRA, in which communication is performed using a plurality of cells, one of the plurality of cells is regarded as a primary cell, and the other cells are regarded as secondary cells, in order to reduce the load on the base station apparatus and the mobile station apparatus as much as possible. The physical uplink control channel PUCCH is allocated to the cell serving as the primary cell, and a special function such as permission of random access is set to the primary cell.

To reduce the power consumption of the mobile station apparatus, the mobile station apparatus does not perform a downlink reception process on secondary cells that have just been assigned (or does not comply with the radio resource allocation information indicated on the physical downlink control channel). After receiving an instruction about activation from the base station apparatus, the mobile station apparatus starts a downlink reception process on the secondary cell for which the instruction about activation has been provided (or complies with the radio resource allocation information indicated on the physical downlink control channel). Further, after receiving an instruction about deactivation for the activated secondary cell from the base station apparatus, the mobile station apparatus stops a downlink reception process on the secondary cell for which the instruction about deactivation has been provided (or does not comply with the radio resource allocation information indicated on the physical downlink control channel).

A secondary cell for which an instruction about activation has been provided from the base station apparatus and in which a downlink reception process is performed is referred to as an activated cell. A secondary cell which has just been assigned from the base station apparatus to the mobile station apparatus, and a secondary cell for which an instruction about deactivation has been provided and in which a downlink reception process is stopped is referred to as a deactivated cell. The primary cell is always an activated cell.

Figure 12:
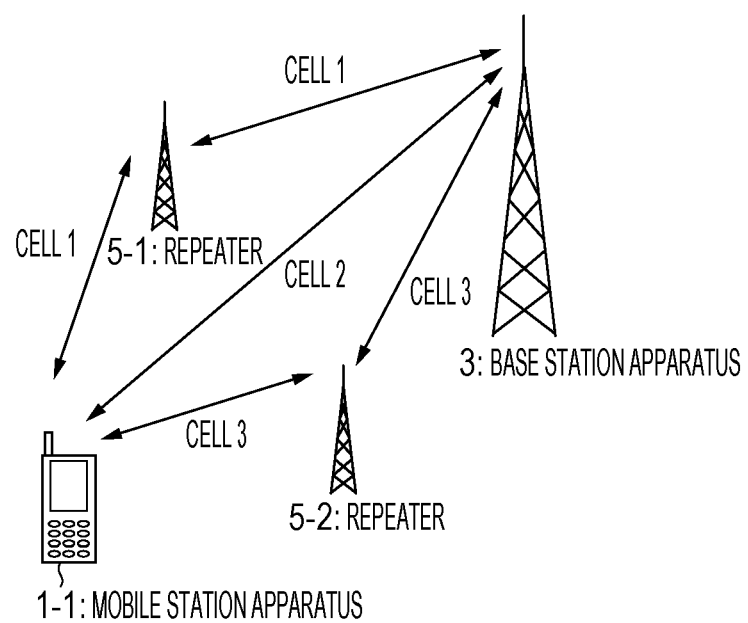
FIG. 12 is a diagram illustrating an example in which a base station apparatus and a mobile station apparatus communicate with each other via a repeater.

The base station apparatus assigns one or more cells suitable for the communication capacity or communication condition of the mobile station apparatus among a plurality of cells. The mobile station apparatus transmits data to and receives data from the base station apparatus via the one or mode cells that have been assigned. In a case where the mobile station apparatus communicates with the base station apparatus by using a plurality of cells, the mobile station apparatus may access the base station apparatus via a repeater, an RRH (Remote Radio Head), or the like as illustrated in FIG. 12. In such a case, the reception timing on the downlink component carrier in the mobile station apparatus and/or the transmission timing on the uplink component carrier for the base station apparatus differs among individual cells. In particular, in a case where the transmission timings on the individual uplink component carriers for the base station apparatus are different, it is necessary for the mobile station apparatus to adjust the transmission timings for the individual uplink component carriers of individual cells before transmitting data to the base station apparatus.

For this reason, the base station apparatus groups cells (or uplink component carriers) having an identical transmission timing, and notifies the mobile station apparatus of cell information (component carrier information) about the grouped cells. The mobile station apparatus adjusts transmission timing for each group of cells having an identical transmission timing reported from the base station apparatus. A group of cells (or component carriers) having an identical transmission timing is referred to as a "transmission timing group". The base station apparatus assigns a plurality of cells to each mobile station apparatus, and then sets a transmission timing group. Also, the base station apparatus resets a transmission timing group to the mobile station apparatus in accordance with a change in communication status.

Among cells of each transmission timing group, there is one timing reference cell. The timing reference cell is used for transmission timing of the transmission timing group. Specifically, the uplink transmission timing of the timing reference cell, which is calculated on the basis of the reception timing in the downlink component carrier of the timing reference cell, is reflected in the uplink transmission timings of all the cells in the transmission timing group. In a transmission timing group including a primary cell, the primary cell is always a timing reference cell. In the other transmission timing groups, a secondary cell for which an instruction to start a random access procedure is provided from the base station apparatus serves as a timing reference cell.

[Description of Configuration]

Figure 1:
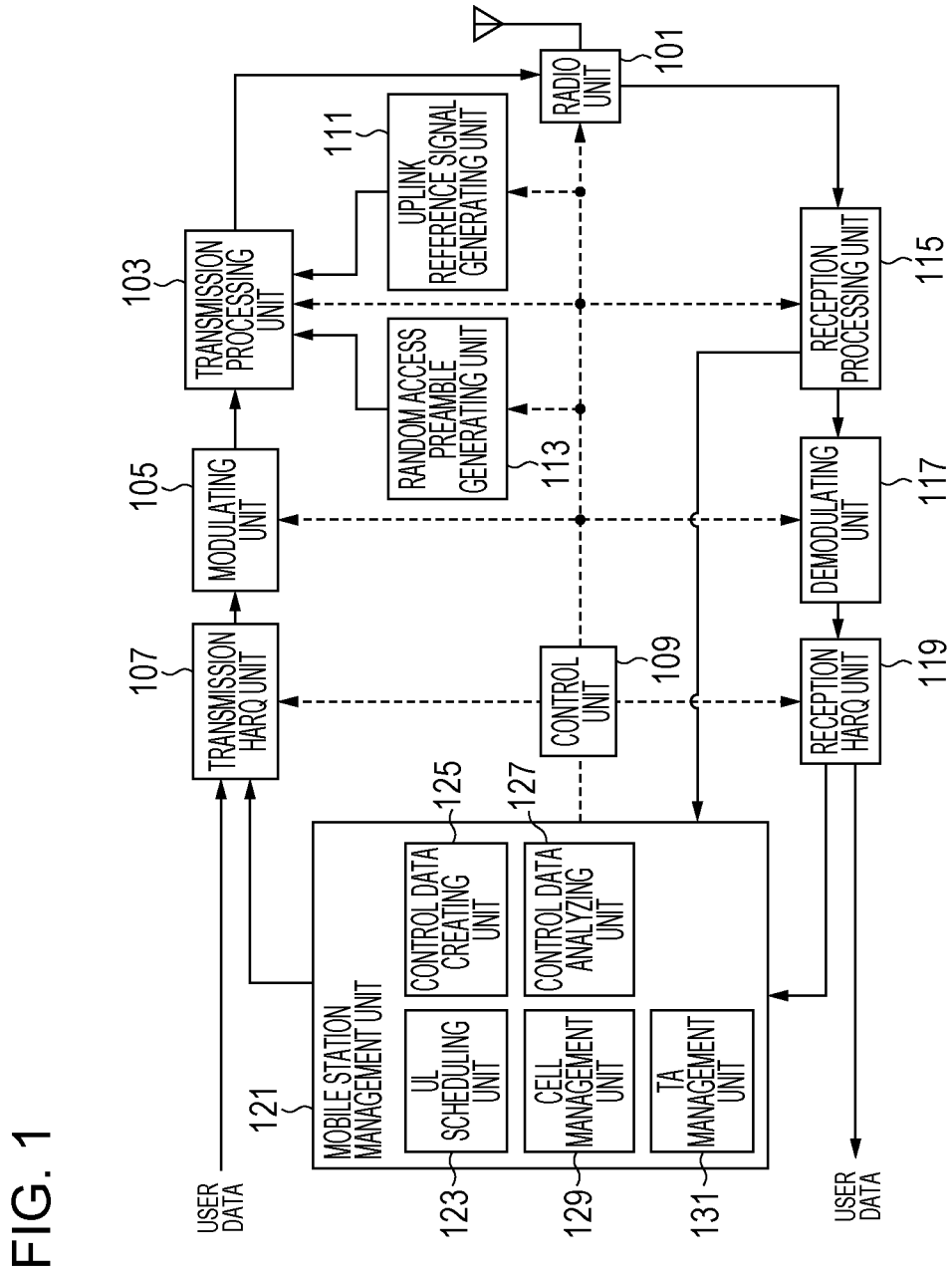
FIG. 1 is a diagram illustrating the configuration of a mobile station apparatus according to an embodiment of the present invention.

FIG. 1 is a diagram illustrating the configuration of a mobile station apparatus according to the embodiment of the present invention. Mobile station apparatuses 1-1 to 1-3 each include a radio unit 101, a transmission processing unit 103, a modulating unit 105, a transmission HARQ processing unit 107, a control unit 109, an uplink reference signal generating unit 111, a random access preamble generating unit 113, a reception processing unit 115, a demodulating unit 117, a reception HARQ processing unit 119, and a mobile station management unit 121. The mobile station management unit 121 includes a UL scheduling unit 123, a control data creating unit 125, a control data analyzing unit 127, a cell management unit 129, and a TA management unit 131.

User data and control data are input to the transmission HARQ processing unit 107. In response to an instruction from the control unit 109, the transmission HARQ processing unit 107 encodes the input data and performs puncture processing on the encoded data. Subsequently, the transmission HARQ processing unit 107 outputs the punctured data to the modulating unit 105, and stores the encoded data therein. In a case where the transmission HARQ processing unit 107 is instructed by the control unit 109 to retransmit data, the transmission HARQ processing unit 107 performs puncture processing that is different from the one performed previously on the encoded data stored therein, and outputs the punctured data to the modulating unit 105. Also, the transmission HARQ processing unit 107 deletes the stored data in response to an instruction from the control unit 109.

The modulating unit 105 modulates the data received from the transmission HARQ processing unit 107, and outputs the resulting data to the transmission processing unit 103. The transmission processing unit 103 maps pieces of data (or signals) received from the modulating unit 105, the uplink reference signal generating unit 111, and the random access preamble generating unit 113 to individual channels of the uplink component carriers of individual cells in response to an instruction from the control unit 109, and performs OFDM signal processing, such as serial/parallel conversion, DFT-IFFT (Inverse Fast Fourier Transform), and CP insertion, on the mapped pieces of data to generate an OFDM signal. Also, the transmission processing unit 103 adjusts the transmission timing of the signal that is output on each uplink component carrier of each cell, by using the transmission timing group information and transmission timing information for adjusting the transmission timing, the transmission timing group information and the transmission timing information being supplied from the control unit 109, or difference information of transmission timing group information and reception timing. After adjusting the transmission timing, the transmission processing unit 103 outputs the OFDM signal to the radio unit 101.

In response to an instruction from the control unit 109, the uplink reference signal generating unit 111 generates an uplink reference signal by using the uplink reference signal generation information obtained from the mobile station management unit 121, and outputs the generated uplink reference signal to the transmission processing unit 103. In a case where the random access preamble generating unit 113 is notified of only a preamble number by the control unit 109, the random access preamble generating unit 113 generates a random access preamble having the preamble number by using random access related information that is set, selects the position of the random access channel RACH on which the random access preamble is to be transmitted, by using the random access related information, and outputs the generated random access preamble and the selected position of the random access channel RACH to the transmission processing unit 103. In a case where the random access preamble generating unit 113 is notified of a preamble number and the position of the random access channel RACH by the control unit 109, the random access preamble generating unit 113 generates a random access preamble having the preamble number by using the random access related information, and outputs the generated random access preamble and the notified position of the random access channel RACH to the transmission processing unit 103.

In response to an instruction from the control unit 109, the radio unit 101 up-converts a signal received from the transmission processing unit 103 to a signal of a radio frequency, and transmits the resulting signal from a transmit antenna. Also, the radio unit 101 down-converts a radio signal received from an antenna, and outputs the resulting signal to the reception processing unit 115. The reception processing unit 115 performs FFT (Fast Fourier Transform) processing on the signal received from the radio unit 101, and outputs the resulting signal to the demodulating unit 117. The reception processing unit 115 calculates optimum reception timing by using the downlink synchronization signal DSCH of each cell or the downlink reference signal of each cell, and updates the reception timing. The reception processing unit 115 notifies the mobile station management unit 121 of the updated reception timing. Also, the reception processing unit 115 measures the downlink channel by using the downlink reference signal, and notifies the mobile station management unit 121 of the measurement result, which is reception timing. The demodulating unit 117 performs demodulation processing on the input data, and outputs the demodulated data to the reception HARQ processing unit 119.

The reception HARQ processing unit 119 performs decoding processing on the input data. In a case where the decoding processing is successful, the reception HARQ processing unit 119 outputs control data to the mobile station management unit 121 and outputs user data to an upper layer. In a case where the decoding processing performed on the input data is unsuccessful, the reception HARQ processing unit 119 stores therein the data for which the decoding processing has failed. When receiving retransmitted data, the reception HARQ processing unit 119 combines the data stored therein and the retransmitted data, and performs decoding processing. Also, the reception HARQ processing unit 119 notifies the mobile station management unit 121 that whether or not decoding processing performed on the input data is successful. The reception HARQ processing unit 119 deletes the data stored therein in response to an instruction from the control unit 109.

In response to an instruction from the mobile station management unit 121, the control unit 109 controls the radio unit 101, the transmission processing unit 103, the modulating unit 105, the transmission HARQ processing unit 107, the uplink reference signal generating unit 111, the random access preamble generating unit 113, the reception processing unit 115, the demodulating unit 117, and the reception HARQ processing unit 119.

The mobile station management unit 121 includes the UL scheduling unit 123, the control data creating unit 125, the control data analyzing unit 127, the cell management unit 129, and the TA management unit 131. The control data creating unit 125 creates an ACK/NACK message, which is a response to received data, from a decoding result of the received data from the reception HARQ processing unit 119, and also creates control data, such as a message representing downlink radio quality. The control data creating unit 125 outputs the created control data to the transmission HARQ processing unit 107.

The control data analyzing unit 127 analyzes control data received from the reception HARQ processing unit 119. The control data analyzing unit 127 outputs, to the cell management unit 129, the cell system information (or cell setting information) and cell assignment information, an activation instruction message, a transmission timing group reconfiguration message, random access instruction information, a random access response message, a contention resolution message, and uplink reference signal generation information that are received from the base station apparatus 3. Also, the control data analyzing unit 127 outputs a transmission timing message or transmission timing timer information to the TA management unit 131.

The UL scheduling unit 123 controls the transmission processing unit 103, the modulating unit 105, and the transmission HARQ processing unit 107 via the control unit 109, on the basis of uplink data scheduling information or a response (ACK/NACK) to transmitted uplink data, which are received from the base station apparatus 3. Also, the UL scheduling unit 123 instructs the cell management unit 129 to a start a random access procedure, on the basis of control information supplied from an upper layer.

The cell management unit 129 manages the cells assigned by the base station apparatus 3, and manages system information or setting information (configuration of physical channels, transmit power information, random access related information required to execute a random access procedure, system information about each cell, such as generation information about an uplink reference signal, and radio resources individually allocated to the mobile station apparatus 1-1, such as a radio resource for an uplink reference signal (measurement reference signal), and a radio resource for the uplink control channel PUCCH) for each cell received from the base station apparatus 3. The cell management unit 129 notifies the random access preamble generating unit 113 of the random access related information via the control unit 109, and notifies the uplink reference signal generating unit 111 of the generation information about an uplink reference signal.

The cell management unit 129 obtains the activation instruction message. In a case where the message includes an activation instruction, the cell management unit 129 instructs, via the control unit 109, the reception processing unit 115, the demodulating unit 117, and the reception HARQ processing unit 119 to start reception processing in the cell for which the activation instruction has been provided. Also, the cell management unit 129 obtains the activation instruction message. In a case where the message includes a deactivation instruction, the cell management unit 129 instructs, via the control unit 109, the reception processing unit 115, the demodulating unit 117, and the reception HARQ processing unit 119 to stop reception processing in the cell for which the deactivation instruction has been provided.

Upon obtaining a transmission timing group reconfiguration message, the cell management unit 129 notifies the TA management unit 131 of group information about a group of cells having an identical transmission timing and a timing reference cell. At the start of communication or in the case of requesting schedule of uplink data, the cell management unit 129 starts a contention based random access procedure, selects a random preamble from random access related information, and notifies the random access preamble generating unit 113 of the preamble number of the selected random preamble via the control unit 109. When obtaining random access instruction information, or in a case where a preamble number is included in a transmission timing group reconfiguration message, the cell management unit 129 starts a non-contention based random access procedure, and notifies the random access preamble generating unit 113 of the random access instruction information or the preamble number and the random access channel number included in the transmission timing group reconfiguration message via the control unit 109.

When obtaining a random access response message, the cell management unit 129 outputs transmission timing information included in the random access response message to the TA management unit 131, and outputs information about an L2/L3 message to the control data creating unit 125. In a case where a non-contention based random access procedure is being executed, the cell management unit 129 ends the non-contention based random access procedure. When obtaining a contention resolution message, the cell management unit 129 ends a contention based random access procedure. When obtaining a random access response message, the cell management unit 129 instructs, via the control unit 109, the transmission processing unit 103, the modulating unit 105, and the transmission HARQ processing unit 107 to start processing of transmitting a transmission timing group for which transmission timing information has been obtained. In a case where the transmission timing timer has expired, the cell management unit 129 instructs, via the control unit 109, the transmission processing unit 103, the modulating unit 105, and the transmission HARQ processing unit 107 to stop the processing of transmitting a transmission timing group for which the transmission timing timer has expired.

The TA management unit 131 manages the transmission timing and transmission timing timer of each transmission timing group. The TA management unit 131 also manages a transmission timing group and a timing reference cell. When obtaining a transmission timing message, the TA management unit 131 notifies, via the control unit 109, the transmission processing unit 103 of transmission timing group information and transmission timing information to which the transmission timing included in the transmission timing message is to be applied, and starts or restarts a transmission timing timer for the transmission timing group to which the transmission timing is to be applied. Upon obtaining the reception timing of each cell from the reception processing unit 115, the TA management unit 131 notifies the transmission processing unit 103 of transmission timing group information and difference information representing a difference between the previous reception timing and the present reception timing. In a case where the transmission timing timer has expired, the TA management unit 131 notifies the cell management unit 129 that the transmission timing timer has expired.

Figure 2:
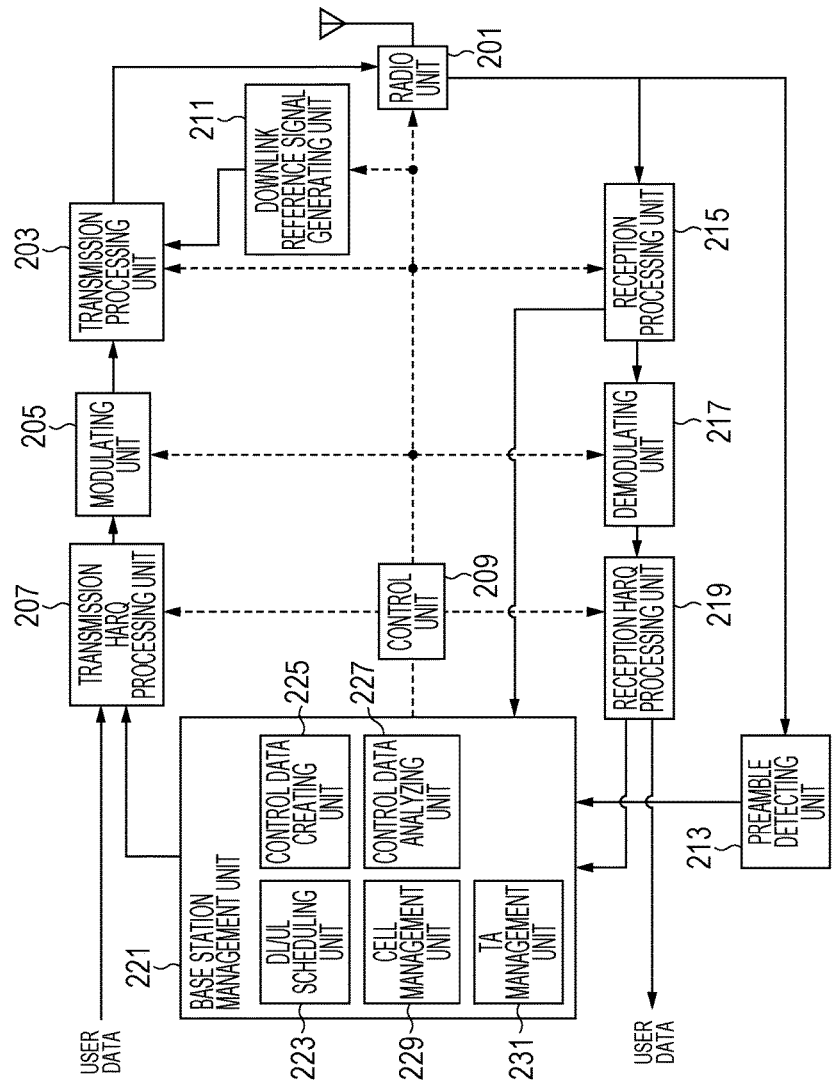
FIG. 2 is a diagram illustrating the configuration of a base station apparatus according to the embodiment of the present invention.

FIG. 2 is a diagram illustrating the configuration of the base station apparatus 3 according to the embodiment of the present invention. The base station apparatus 3 includes a radio unit 201, a transmission processing unit 203, a modulating unit 205, a transmission HARQ processing unit 207, a control unit 209, a downlink reference signal generating unit 211, a preamble detecting unit 213, a reception processing unit 215, a demodulating unit 217, a reception HARQ processing unit 219, and a base station management unit 221. The base station management unit 221 includes a DL/UL scheduling unit 223, a control data creating unit 225, a control data analyzing unit 227, a cell management unit 229, and a TA management unit 231.

User data and control data are input to the transmission HARQ processing unit 207. In response to an instruction from the control unit 209, the transmission HARQ processing unit 207 encodes the input data and performs puncture processing on the encoded data. Subsequently, the transmission HARQ processing unit 207 outputs the punctured data to the modulating unit 205 and stores the encoded data therein. Also, in the case of instructed by the control unit 209 to retransmit data, the transmission HARQ processing unit 207 obtains the encoded data stored therein, performs puncture processing that is different from the one performed previously on the data, and outputs the punctured data to the modulating unit 205. The transmission HARQ processing unit 207 deletes the data stored therein, in response to an instruction from the control unit 209.

The modulating unit 205 modulates the data received from the transmission HARQ processing unit 207, and outputs the resulting data to the transmission processing unit 203. The transmission processing unit 203 maps pieces of data (or signals) received from the modulating unit 205 and the downlink reference signal generating unit 211 to respective channels, such as the physical downlink control channel PDCCH, the downlink synchronization channel DSCH, the physical broadcast channel PBCH, and the physical downlink shared channel PDSCH, of the downlink component carriers of individual cells in response to an instruction from the control unit 209, and performs OFDM signal processing, such as serial/parallel conversion, IFFT (Inverse Fast Fourier Transform), and CP insertion, on the mapped pieces of data to generate an OFDM signal. Subsequently, the transmission processing unit 203 outputs the generated OFDM signal to the radio unit 201.

In response to an instruction from the control unit 209, the radio unit 201 up-converts the signal received from the transmission processing unit 203 to a signal of a radio frequency, and transmits the resulting signal from a transmit antenna to the mobile station apparatuses 1-1 to 1-3. Also, the radio unit 201 receives, from an antenna, a radio signal transmitted from the mobile station apparatus 1-1, down-converts the received signal to a baseband signal, and outputs the resulting received signal to the reception processing unit 215 or the preamble detecting unit 213. The reception processing unit 215 performs FFT (Fast Fourier Transform) processing on the signal received from the radio unit 201, and outputs the resulting signal to the demodulating unit 217. Also, the reception processing unit 215 measures radio channel quality or an amount of difference in transmission timing in the uplink from the uplink reference signal (sounding reference signal), and supplies the measurement result to the base station management unit 221. Although it is assumed that a single-carrier scheme such as DFT-spread OFDM is used as an uplink communication scheme, a multi-carrier scheme such as an OFDM scheme may be used. The demodulating unit 217 performs demodulation processing on the input data, and outputs the demodulated data to the reception HARQ processing unit 219.

The reception HARQ processing unit 219 performs decoding processing on the input data. In a case where the decoding processing is successful, the reception HARQ processing unit 219 outputs control data to the base station management unit 221 and outputs user data to an upper layer. In a case where the decoding processing performed on the input data is unsuccessful, the reception HARQ processing unit 219 stores therein the data for which the decoding processing ended unsuccessful. When receiving retransmitted data, the reception HARQ processing unit 219 combines the data stored therein and the retransmitted data together and performs decoding processing. Also, the reception HARQ processing unit 219 notifies the base station management unit 221 that whether or not decoding processing performed on the input data is successful. The reception HARQ processing unit 219 deletes the data stored therein, in response to an instruction from the control unit 209.

The preamble detecting unit 213 performs correlation processing on the signal received from the radio unit 201, and performs processing of detecting a random access preamble. When detecting a random access preamble, the preamble detecting unit 213 calculates an amount of difference in transmission timing by using the detected random access preamble. The preamble detecting unit 213 notifies the base station management unit 221 of the cell for which the random access preamble has been detected, information about the detected preamble, and the amount of difference in transmission timing. The control unit 209 controls the radio unit 201, the transmission processing unit 203, the modulating unit 205, the transmission HARQ processing unit 207, the downlink reference signal generating unit 211, the reception processing unit 215, the demodulating unit 217, and the reception HARQ processing unit 219, in response to an instruction from the base station management unit 221.

The base station management unit 221 includes the DL/UL scheduling unit 223 that performs downlink and uplink scheduling, the control data creating unit 225, the control data analyzing unit 227, the cell management unit 229, and the TA management unit 231. The DL/UL scheduling unit 223 performs scheduling for mapping user data and control data to respective downlink channels, by using the downlink radio channel quality information reported from the mobile station apparatus 1-1, data information about each user reported from an upper layer, and control data created by the control data creating unit 225, and outputs the scheduling result to the control unit 209. Also, the DL/UL scheduling unit 223 performs scheduling for mapping user data to respective uplink channels, by using the result regarding the uplink radio channel quality supplied from the reception processing unit 215 and a radio resource allocation request transmitted from the mobile station apparatus 1-1.

When being notified that a random access preamble has been detected by the preamble detecting unit 213, the DL/UL scheduling unit 223 allocates the physical uplink shared channel PUSCH and notifies the control data creating unit 225 of the allocated physical uplink shared channel PUSCH and a preamble number. When being notified of, by the TA management unit 231, transmission timing information and transmission timing group information about a group to which the transmission timing is to be applied, the DL/UL scheduling unit 223 notifies the TA management unit 231 that transmission timing information is to be transmitted, and notifies the control data creating unit 225 of transmission timing information and transmission timing group information about a group to which the transmission timing is to be applied. Also, in a case where downlink user data is generated for a mobile station apparatus that is out of uplink synchronization, the DL/UL scheduling unit 223 instructs the cell management unit 229 to cause the mobile station apparatus to perform a random access procedure.

The control data creating unit 225 creates control data to be mapped to the physical downlink control channel PDCCH and control data to be mapped to the physical downlink shared channel PDSCH. The control data creating unit 225 creates control data, such as a control message including schedule information; a response (ACK/NACK) to uplink data; a system information message including physical channel configuration information, transmit power information about each channel, and random access related information; an initial setting message including setting information of a cell to be used (including random access related information); activation instruction message for providing an instruction to activate/deactivate a cell; a random access response message including a preamble number, transmission timing information, and scheduling information; a contention resolution message; a transmission timing group reconfiguration message including random access instruction information including a preamble number of a random access channel number, transmission timing group information, timing reference cell information, a preamble number, and a random access channel number; and a transmission timing message including transmission timing information. The control data analyzing unit 227 controls the transmission HARQ processing unit 207 via the control unit 209, in accordance with a result of a response (ACK/NACK) of downlink data from the mobile station apparatus 1-1.

The cell management unit 229 manages individual cells and pieces of system information (physical channel configuration information, transmit power information for individual channels, random access related information, cell relationship information for transmission timing) about the individual cells. Also, the cell management unit 229 assigns one or more cells to the mobile station apparatuses 1-1 to 1-3. Further, the cell management unit 229 allocates a radio resource for the uplink reference signal (sounding reference signal) and a radio resource for the physical uplink control channel PUCCH. Then, the cell management unit 229 outputs cell assignment information, cell system information (cell setting information), and radio resource information representing radio resources to be allocated to the mobile station apparatuses 1-1 to 1-3, so as to notify the control data creating unit 225 of information about the assigned cells.

The cell management unit 229 determines whether the assigned cells are activated or deactivated, on the basis of a communication status of data transmission to the mobile station apparatus 1-1 or data transmission from the mobile station apparatus 1-1. The cell management unit 229 notifies the control data creating unit 225 of determined activation/deactivation instruction information about the assigned cells. When receiving an instruction to cause the mobile station apparatus to execute a random access procedure from the DL/UL scheduling unit 223, the cell management unit 229 selects a preamble number and a random access channel number from the random access related information about the cell, and notifies the control data creating unit 225 of the preamble number of the random access channel number.

When obtaining transmission timing group information and timing reference cell information from the TA management unit 231, the cell management unit 229 determines whether or not a random access procedure is to be executed in the transmission timing group. In the case of executing a random access procedure, the cell management unit 229 selects a preamble number and a random access channel RACH number from the random access related information about the timing reference cell, and notifies the control data creating unit 225 of the transmission timing group information, timing reference cell information, preamble number, and random access channel number. In the case of not executing a random access procedure, the cell management unit 229 notifies the control data creating unit 225 of the transmission timing group information and timing reference cell information.

The TA management unit 231 manages the transmission timing and transmission timing timer of each cell for the mobile station apparatuses 1-1 to 1-3. The TA management unit 231 also manages cell relationship information about cells having an identical transmission timing and timing reference cells. When obtaining an amount of difference in transmission timing from the preamble detecting unit 213 or the reception processing unit 215, the TA management unit 231 determines a group of cells having an identical transmission timing, and also determines a timing reference cell which serves as a reference of timing. The TA management unit 231 notifies the cell management unit 229 of the determined transmission timing group information and timing reference cell information. When being notified of transmission of transmission timing information from the DL/UL scheduling unit 223, the TA management unit 231 starts or restarts a transmission timing timer.

[Description of Operation]

The wireless communication system described above with reference to FIGS. 10 and 11 is assumed in which a base station apparatus assigns a plurality of cells to a mobile station apparatus and the base station apparatus communicates with the mobile station apparatus via the plurality of assigned cells. Also, the wireless communication system described above with reference to FIG. 12 is assumed in which communication is performed via a plurality of cells in which transmission timings from the mobile station apparatus are different from one another.

In Advanced-EUTRA, a base station apparatus assigns one or more cells of different frequencies suitable for the communication capacity or communication condition of a mobile station apparatus from among a plurality of cells, for each frequency. The mobile station apparatus transmits data to and receives data from the base station apparatus via the assigned cells. In a case where the mobile station apparatus communicates with the base station apparatus by using a plurality of cells, the mobile station apparatus may access the base station apparatus via a repeater, an RRH (Radio Remote Head), or the like as illustrated in FIG. 12. In such a case, reception timing of data on a downlink component carrier in the mobile station apparatus may vary among individual cells. Further, transmission timing for the base station apparatus may vary among uplink component carriers of individual cells. In a case where the transmission timing for the base station apparatus varies among individual uplink component carriers, the base station apparatus groups cells in which the transmission timing from a mobile station apparatus is identical (hereinafter, a group of cells is referred to as a transmission timing group). The mobile station apparatus adjusts transmission timing for each cell group in which the transmission timing is identical.

Each transmission timing group includes one timing reference cell. The mobile station apparatus determines the transmission timing for each transmission timing group in accordance with the transmission timing information reported from the base station apparatus and the downlink reception timing of the timing reference cell, on the basis of the downlink reception timing of the timing reference cell.

The base station apparatus may reconfigure a transmission timing group for a mobile station apparatus, in accordance with a change in communication status caused by a movement of the mobile station apparatus. In a case where the base station apparatus resets a transmission timing group and where a timing reference cell is deleted from the transmission timing group or is moved to another transmission timing group, the timing reference cell of the transmission timing group does not exist any more, and the mobile station apparatus becomes incapable of performing uplink transmission.

In the case of reconfiguring a transmission timing group, the base station apparatus transmits a transmission timing group reconfiguration message to the mobile station apparatus. In a case where a timing reference cell is to be changed, the transmission timing group reconfiguration message includes at least the group number of the transmission timing group, and cell information about cells included in the transmission timing group, timing reference cell information, a preamble number, and a random access channel number. When receiving the transmission timing group reconfiguration message, the mobile station apparatus sets a transmission timing group and sets a reference cell in accordance with an instruction provided in the transmission timing group reconfiguration message.

Further, in a case where the timing reference cell has been changed, the mobile station apparatus transmits a random access preamble on the uplink of the timing reference cell by using the preamble number and the random access channel number included in the transmission timing group reconfiguration message, and starts a random access procedure. The mobile station apparatus then obtains transmission timing information from the base station apparatus, and sets the obtained transmission timing. In this way, the base station apparatus notifies the mobile station apparatus of random access information, such as a preamble number, which is included in a transmission timing reconfiguration message. Accordingly, even in a case where the timing reference cell in the transmission timing group is changed or deleted, the mobile station apparatus is capable of immediately setting transmission timing, and is thus capable of immediately performing uplink transmission.

The base station apparatus and the mobile station apparatus have one transmission timing timer for each transmission timing group, thereby managing transmission timing. Hereinafter, a description will be given under the assumption that a transmission timing group made up of cells including a primary cell is referred to as a first transmission timing group, and a transmission timing group made up of only secondary cells is referred to as a second transmission timing group. The number of first transmission timing groups is always one, and the number of second transmission timing groups is one or more. Each transmission timing group has one timing reference cell, and the timing reference cell of the first transmission timing group is always a primary cell.

Figures 1, 3:
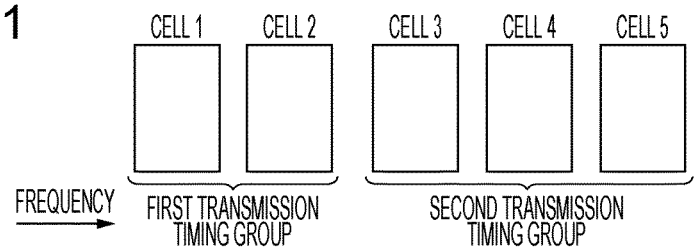
Figures 2, 3:
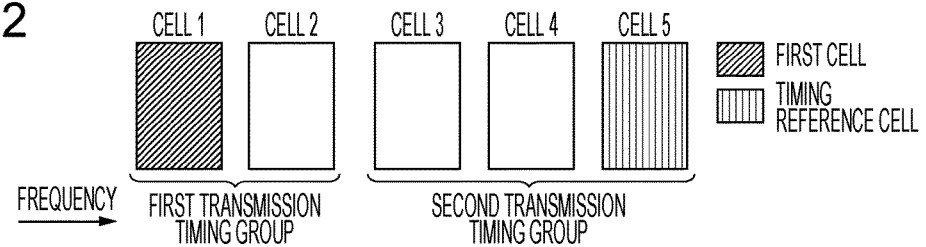
Figure 3:
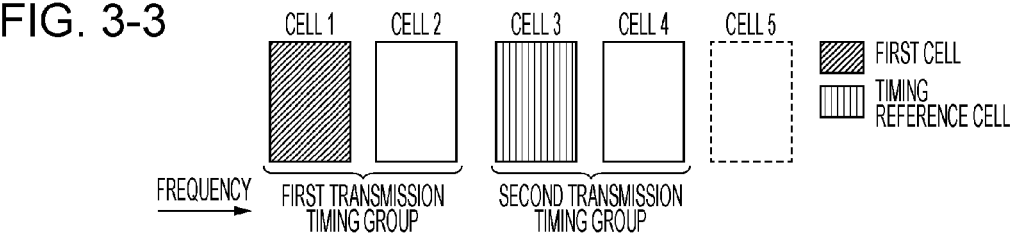

The operations of the mobile station apparatus 1-1 and the base station apparatus 3 will be described. Here, it is assumed that, for example, the base station apparatus 3 has cells 1 to 5, as illustrated in FIG. 3-1. The cells 1 and 2 belong to a transmission timing group having an identical transmission timing, and the cells 3 to 5 belong to another transmission timing group having an identical transmission timing.

The mobile station apparatus 1-1 performs cell search and finds one cell of the base station apparatus 3. Here, it is assumed that the mobile station apparatus 1-1 finds the cell 1. The mobile station apparatus 1-1 receives the physical broadcast channel PBCH or the like of the cell 1 and obtains system information (physical channel configuration, transmit power information, and random access related information about the cell). Subsequently, the mobile station apparatus 1-1 transmits a random access preamble on the random access channel RACH of the cell 1 for initial access, by using the random access related information included in the system information. Subsequently, the mobile station apparatus 1-1 obtains, from the base station apparatus 3, a random access response message including transmission timing information for the cell 1, sets the transmission timing for the uplink component carrier of the cell 1, and starts the transmission timing timer. The mobile station apparatus 1-1 transmits a message 3 to the base station apparatus 3 via the cell 1. The mobile station apparatus 1-1 includes the content indicating initial access in the message 3 and transmits the message 3. Upon receiving a contention resolution from the base station apparatus 3, the mobile station apparatus 1-1 ends the contention based random access procedure.

After the random access procedure has been completed, the base station apparatus 3 assigns cells to be used by the mobile station apparatus 1-1, sets a primary cell, and also sets transmission timing groups and a timing reference cell in each of the transmission timing groups. Here, as illustrated in FIG. 3-2, the base station apparatus 3 assigns cells 1 to 5 to the mobile station apparatus 1-1, sets the cell 1 as a primary cell, and sets the cells 2 to 5 as secondary cells. The base station apparatus 3 sets the cells 1 and 2 to a first transmission timing group, and sets the cells 3 to 5 to a second transmission timing group. Also, the base station apparatus 3 sets the cell 1 as the timing reference cell of the first transmission timing group, and sets the cell 5 as the timing reference cell of the second transmission timing group. The primary cell is always a timing reference cell.

Subsequently, the base station apparatus 3 notifies the mobile station apparatus 1-1 of setting information, such as system information about the cells assigned to the mobile station apparatus 1-1, group information about the transmission timing groups, timing reference cell information, assignment information about the physical uplink control channel PUCCH of the primary cell, uplink reference signal (sounding reference signal) generation information, radio resource allocation information for transmitting the uplink reference signal (sounding reference signal), and radio resource allocation information about the periodical physical uplink shared channel PUSCH. Here, a description is given under the assumption that the base station apparatus 3 transmits an activation instruction message to the mobile station apparatus 1-1 and that the cells 2 to 5 are activated.

After obtaining the system information about the assigned cells and the group information about the transmission timing groups, the mobile station apparatus 1-1 sets the transmission timing of the cell 1 as the uplink transmission timing of the cell 2 in the first transmission timing group including the cell 1. After that, the mobile station apparatus 1-1 and the base station apparatus 3 transmit and receive data via the downlink component carriers of the cells 1 to 5 and the uplink component carriers of the cells 1 and 2.

In a case where the amount of data transmitted from the mobile station apparatus 1-1 increases and where there is a cell that is not being used by the mobile station apparatus 1-1, the base station apparatus 3 notifies, on the physical downlink control channel PDCCH, the mobile station apparatus 1-1 of random access instruction information for providing an instruction to perform non-contention based random access in the cells in the second transmission timing group. Here, the base station apparatus 3 notifies the mobile station apparatus 1-1 of random access instruction information for the cell 5. The random access instruction information includes a preamble number and a random access channel number. The mobile station apparatus 1-1 checks the preamble number. In a case where the preamble number indicates a non-contention based random access procedure, the mobile station apparatus 1-1 transmits a random access preamble on the random access channel RACH of the cell 5, by using the preamble number and the random access channel number specified by the base station apparatus 3.

Upon detecting the random access preamble, the base station apparatus 3 calculates transmission timing information by using the random access preamble, and transmits a random access response message including the transmission timing information to the mobile station apparatus 1-1 via the downlink component carrier of the cell 5. Upon receiving the random access response message, the mobile station apparatus 1-1 sets the transmission timing included in the random access response message as the uplink transmission timing of the cell 5. Further, the mobile station apparatus 1-1 sets the transmission timing as the uplink transmission timing of the cells 3 and 4 in the same transmission timing group, and starts the transmission timing timer. Subsequently, the mobile station apparatus 1-1 completes the non-contention based random access procedure. After that, data is transmitted and received between the mobile station apparatus 1-1 and the base station apparatus 3 by additionally using the uplink component carriers of the cells 3 to 5.

The mobile station apparatus 1-1 has one transmission timing timer for each transmission timing group, and starts or restarts a target transmission timing timer upon receiving transmission timing information. Likewise, the base station apparatus 3 has one transmission timing timer for each transmission timing group, and starts or restarts a target transmission timing timer upon transmitting transmission timing information. While the transmission timing timer is operating, a target uplink is in an uplink synchronization state (the transmission timing is valid). In this state, the mobile station apparatus 1-1 is capable of performing uplink transmission on the uplink component carriers of the target transmission timing group. A transmission timing timer may be provided for each cell. The base station apparatus 3 measures the uplink reference signal from the mobile station apparatus 1-1, and thereby calculates transmission timing information. In a case where it is necessary to maintain the transmission timing, the base station apparatus 3 notifies the mobile station apparatus 1-1 of the transmission timing information.

The base station apparatus 3 receives uplink signals, such as uplink reference signals, of individual cells from the mobile station apparatus 1-1, and calculates a difference in transmission timing among the individual cells in the transmission timing group. In a case where the transmission timing varies among the cells in the transmission timing group, the base station apparatus 3 reconfigures the transmission timing group. In the case of reconfiguring the transmission timing group and changing the timing reference cell, the base station apparatus 3 transmits, to the mobile station apparatus 1-1, a transmission timing group reconfiguration message including identification information about the transmission timing group, identification information about the cells included in the transmission timing group, identification information about a new timing reference cell, a preamble number, and a random access channel number. Here, as illustrated in FIG. 3-3, a description will be given of an example in which the cell 5 is deleted from the second transmission timing group, the second transmission timing group is reconfigured by using the cells 3 and 4, and the timing reference cell is changed to the cell 3.

When receiving the transmission timing group reconfiguration message, the mobile station apparatus 1-1 reconfigures the second transmission timing group by using the cells 3 and 4, and sets the cell 3 as a timing reference cell. Subsequently, the mobile station apparatus 1-1 generates a random access preamble from the random access preamble number included in the transmission timing group reconfiguration message, and transmits the generated random access preamble on the random access channel RACH of the timing reference cell (cell 3) indicated by the random access channel number included in the transmission timing group reconfiguration message. Subsequently, the mobile station apparatus 1-1 receives a random access response message that is transmitted from the base station apparatus 3 in response to the random access preamble. The mobile station apparatus 1-1 sets the transmission timing information included in the random access response message to the cells in the second transmission timing group (cells 3 and 4). Subsequently, the mobile station apparatus 1-1 continues uplink transmission.

In this case, the transmission timing group reconfiguration message includes identification information about the second transmission timing group, identification information about the cells 3 and 4 included in the second transmission timing group, identification information about the cell 3 serving as a new timing reference cell, a preamble number, and a random access channel number.

In a case where the timing reference cell has been changed, the transmission timing timer that is set to the transmission timing group is continuously operated. The mobile station apparatus 1-1 maintains the uplink radio resources for the uplink reference signals or the like, assigned to the individual cells of the transmission timing group. The transmission timing timer may be stopped or expired. Also in that case, the uplink radio resources for the uplink reference signals or the like, assigned to the individual cells of the transmission timing group are maintained.

In the above-described example, a timing reference cell is deleted, but the same applies to the case of changing only a timing reference cell in a transmission timing group. For example, the same applies to a case where the cell configuration in the transmission timing group is not changed, and only the timing reference cell is changed from the cell 5 to the cell 3. In this way, the base station apparatus 3 transmits a transmission timing reconfiguration message including random access information, such as a preamble number, to the mobile station apparatus. Accordingly, even in a case where the timing reference cell in the transmission timing group is changed or deleted, the mobile station apparatus 1-1 is capable of immediately setting transmission timing, and is thus capable of immediately performing uplink transmission.

In a case where a new timing reference cell that is set in accordance with the transmission timing group reconfiguration message is in a deactivated state, the mobile station apparatus 1-1 sets all the cells in the transmission timing group to be in a deactivated state. In the case of setting a deactivated cell as a timing reference cell, the base station apparatus 3 does not have to include a random access preamble number and a random access channel number in the transmission timing group reconfiguration message.

In a case where a new timing reference cell that is set in accordance with the transmission timing group reconfiguration message is in a deactivated state, and where a preamble number and a random access channel number are assigned in the transmission timing group reconfiguration message, the mobile station apparatus 1-1 may activate the timing reference cell and transmit a random access preamble. In this way, the base station apparatus 3 is capable of quickly activating the timing reference cell without transmitting an activation instruction message.

In the case of reconfiguring a transmission timing group without changing a timing reference cell, the base station apparatus 3 may notify the mobile station apparatus 1-1 of only the group number of the transmission timing group and cell information about cells included in the transmission timing group. In this case, the mobile station apparatus 1-1 performs only reconfiguration of the transmission timing group. In a case where the system information about individual cells that the mobile station apparatus 1-1 is notified of by the base station apparatus 3 does not include random access related information, the base station apparatus 3 may include the random access related information in the transmission timing group reconfiguration message. In this case, the base station apparatus 3 may notify only the timing reference cell of the random access related information. The random access related information may be included in random access information such as a preamble number.

In a case where a cell that has been deleted from a certain transmission timing group is moved to another transmission timing group, the mobile station apparatus 1-1 determines the state of the moved cell on the basis of the state of the timing reference cell in the other transmission timing group and the state of the cell before movement. That is, in a case where a cell that has been deleted from a certain transmission timing group is moved to another transmission timing group, and where the timing reference cell in the other transmission timing group is in an activated state, the mobile station apparatus 1-1 maintains the state of the moved cell in the state before the cell is deleted from the certain transmission timing group. For example, it is assumed that the cell 5 that has been deleted from the second transmission timing group is moved to the first transmission timing group. Because the timing reference cell in the first transmission timing group is in an activated state and the cell 5 is in an activated state, the mobile station apparatus 1-1 maintains the cell 5 in an activated state.

Also, in a case where a cell that has been deleted from a certain transmission timing group is moved to another transmission timing group, and where the timing reference cell of the other transmission timing group is in a deactivated state, the mobile station apparatus 1-1 sets the cell to be in a deactivated state. In a case where a cell that has been deleted from a certain transmission timing group is set to a new transmission timing group, the mobile station apparatus 1-1 sets the cell to be in a deactivated state.

Further, in a case where the transmission timing of the other transmission timing group is valid and where the state of the moved cell is an activated state, the mobile station apparatus 1-1 sets the transmission timing of the other transmission timing group to the transmission timing of the moved cell. In this case, the mobile station apparatus 1-1 maintains the uplink radio resources for the uplink reference signals or the like, assigned to the moved cell before movement. In a case where the transmission timing of the other transmission timing group is invalid and where the state of the moved cell is an activated state, the mobile station apparatus 1-1 invalidates the transmission timing before movement, and does not set transmission timing for the moved cell. In this case, the mobile station apparatus 1-1 releases the uplink radio resources for the uplink reference signals or the like, assigned to the moved cell before movement.

For example, in a case where the cell 5 that has been deleted from the second transmission timing group is moved to the first transmission timing group, because the moved cell is in an activated state and the transmission timing of the first transmission timing group is valid, the mobile station apparatus 1-1 sets the timing reference cell of the cell 5 to the cell 1, and sets the transmission timing of the first transmission timing group to the transmission timing of the cell 5. In a case where the transmission timing of the transmission timing group to which the cell has been moved is invalid, the mobile station apparatus 1-1 only sets the timing reference cell of the transmission timing group, and does not set transmission timing.

In the case of changing the timing reference cell of the second transmission timing group from the cell 5 to the cell 3 and moving the cell 5 to the first transmission timing group, the base station apparatus 3 transmits a transmission timing group reconfiguration message for the first transmission timing group and a transmission timing group reconfiguration message for a second transmission timing group to the mobile station apparatus 1-1.

In this way, it is determined whether or not the cell that has been moved to another transmission timing group is set to be in an activated state on the basis of the state of the timing reference cell of the transmission timing group to which the cell has been moved. Accordingly, communication can be continued even in a case where a cell in an activated state is moved to another transmission timing group.

Figure 4:
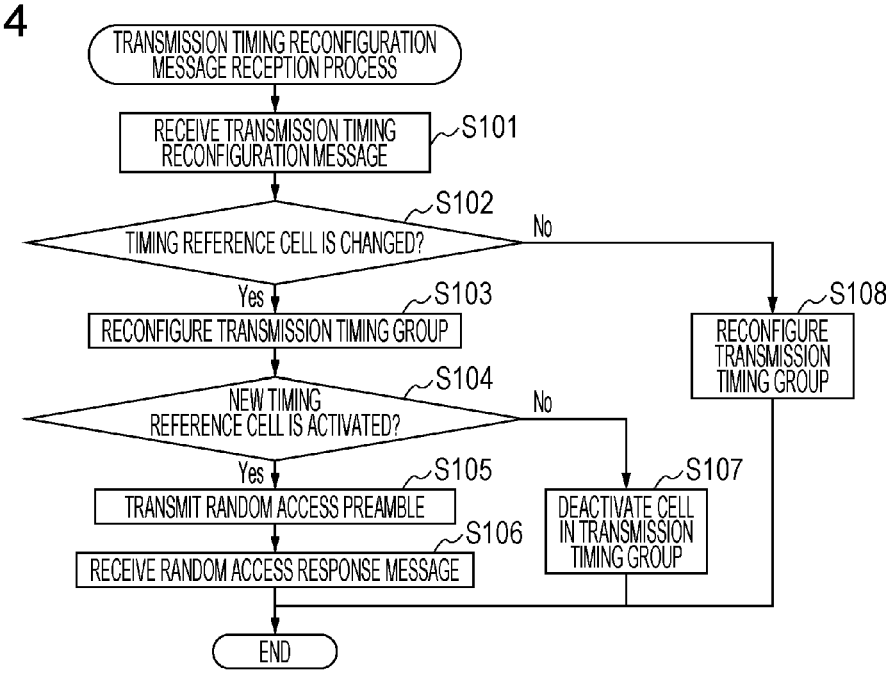
FIG. 4 is a flowchart illustrating an example operation of the mobile station apparatus at the time of receiving a transmission timing group reconfiguration message.

A description will be given of a process performed by the mobile station apparatus 1-1 in response to reception of a transmission timing group reconfiguration message, with reference to the flowchart illustrated in FIG. 4.

The mobile station apparatus 1-1 receives a transmission timing reconfiguration message (step S101). The mobile station apparatus 1-1 determines, with reference to the transmission timing reconfiguration message, whether or not a timing reference cell is changed (step S102). In a case where the timing reference cell is changed, the mobile station apparatus 1-1 reconfigures a transmission timing group in accordance with the transmission timing reconfiguration message (step S103). The mobile station apparatus 1-1 determines whether or not the new timing reference cell is activated (step S104).

In a case where the new timing reference cell is activated, the mobile station apparatus 1-1 transmits a random access preamble to the base station apparatus 3 via the new timing reference cell, by using the preamble number included in the transmission timing reconfiguration message (step S105). Upon receiving a random access response message from the base station apparatus 3, the mobile station apparatus 1-1 sets the transmission timing of the transmission timing group (step S106). In a case where the new timing reference cell is deactivated, the mobile station apparatus 1-1 sets all the cells in the transmission timing group to be in a deactivated state (step S107). In a case where the timing reference cell is changed, the mobile station apparatus 1-1 reconfigures the transmission timing group in accordance with the transmission timing reconfiguration message (step S108).

While an embodiment of the present invention has been described in detail above with reference to the drawings, a specific configuration is not limited to the one described above, and various design changes or the like can be made without deviating from the gist of the present invention.

For the convenience of description, the mobile station apparatus 1-1 and the base station apparatus 3 according to the embodiment have been described by using functional block diagrams. A program for implementing the functions of the individual units of the mobile station apparatus 1-1 and the base station apparatus 3 or some of the functions may be recorded on a computer-readable recording medium, the program recorded on the recording medium may be read by a computer system so as to be executed, and thereby the mobile station apparatus and the base station apparatus may be controlled. Here, the "computer system" includes an OS and hardware, such as peripheral devices.

The "computer-readable recording medium" is a portable medium, such as a flexible disk, a magneto-optical disk, a ROM, or a CD-ROM, or a storage device, such as a hard disk built in the computer system. Furthermore, the "computer-readable recording medium" includes a medium that dynamically holds a program for a short time, such as a communication line used for transmitting a program via a network such as the Internet or a communication line such as a telephone line, and a medium that holds a program for a certain time period, such as a volatile memory in the computer system serving as a server or a client in that case. The above-described program may be used to implement some of the above-described functions, and may be a program that is capable of implementing the above-described functions in combination with a program that has already been recorded in the computer system.

The individual functional blocks used in the above-described embodiment may typically be implemented as an LSI, which is an integrated circuit. The individual functional blocks may be individually formed as chips, or some or all of them may be integrated into a chip. A method for integration is not limited to an LSI, and may be a dedicated circuit or a general-purpose processor. In a case where the progress of semiconductor technologies produces an integration technology that replaces an LSI, an integrated circuit based on the technology may be used.

The embodiment of the present invention has been described in detail with reference to the drawings. A specific configuration is not limited to the embodiment, and design or the like within the scope of the gist of the present invention is also included in the claims.

REFERENCE SIGNS LIST

1-1 to 1-3 mobile station apparatus
3 base station apparatus
5-1, 5-2 repeater
101, 201 radio unit
103, 203 transmission processing unit
115, 215 reception processing unit
107, 207 transmission HARQ processing unit
119, 219 reception HARQ processing unit
109, 209 control unit
121 mobile station management unit
221 base station management unit

The invention claimed is:

1. A mobile station apparatus comprising:
   radio circuitry that communicates with a base station apparatus using a plurality of cells which are configured for the mobile station apparatus, the plurality of cells being grouped into a plurality of groups, each of the plurality of groups containing at least one cell having a same transmission timing advance, and
   management circuitry that, in a case where one or more cells are deleted from one of the plurality of groups and the deleted one or more cells are added to another one of the plurality of groups in accordance with a message from the base station apparatus, sets the added one or more cells to a deactivated status.

2. The mobile station apparatus according to claim 1, wherein
   in a case where a secondary cell is deactivated, the mobile station apparatus is configured to not perform a downlink reception process on the secondary cell.

3. The mobile station apparatus according to claim 1, wherein
   in the case where the deleted one or more cells are added to the another one of the plurality of groups, the management circuitry sets a transmission timing advance of the added one or more cells based on a validity of transmission timing of the another one of the plurality of groups.

4. A communication method of a mobile station apparatus that is configured to communicate with a base station apparatus using a plurality of cells which are configured for the mobile station apparatus, wherein
   the plurality of cells are grouped into a plurality of groups, each of the plurality of groups containing at least one cell having a same transmission timing advance,
   the communication method comprising:
   in a case where one or more cells are deleted from one of the plurality of groups and the deleted one or more cells are added to another one of the plurality of groups in accordance with a message from the base station apparatus, setting the added one or more cells a deactivated status.

5. The communication method according to claim 4, wherein
   in a case where a secondary cell is deactivated, the mobile station apparatus is configured to not perform a downlink reception process on the secondary cell.

6. The communication method according to claim 4, further comprising:
   in the case where the deleted one or more cells are added to the another one of the plurality of groups, setting a transmission timing advance of the added one or more cells based on a validity of transmission timing of the another one of the plurality of groups.

7. An integrated circuit mounted in a mobile station apparatus comprising:
   radio circuitry that communicates with a base station apparatus using a plurality of cells which are configured for the mobile station apparatus, the plurality of cells being grouped into a plurality of groups, each of the plurality of groups containing at least one cell having a same transmission timing advance, and management circuitry that, in a case where one or more cells are deleted from one of the plurality of groups and the deleted one or more cells are added to another one of the plurality of groups in accordance with a message from the base station apparatus, sets the added one or more cells to a deactivated status.

8. The integrated circuit according to claim 7, wherein in a case where a secondary cell is deactivated, the mobile station apparatus is configured to not perform a downlink reception process on the secondary cell.

9. The integrated circuit according to claim 7, wherein in the case where the deleted one or more cells are added to the another one of the plurality of groups, the management circuitry sets a transmission timing advance of the added one or more cells based on a validity of transmission timing of the another one of the plurality of groups.

* * * * *